(12) United States Patent
Gothard

(10) Patent No.: US 8,103,387 B2
(45) Date of Patent: Jan. 24, 2012

(54) ADAPTIVE POWER SYSTEM

(75) Inventor: Joseph A. Gothard, Germantown, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 360 days.

(21) Appl. No.: 12/385,998

(22) Filed: Apr. 27, 2009

(65) Prior Publication Data

US 2009/0326727 A1 Dec. 31, 2009

Related U.S. Application Data

(60) Provisional application No. 61/071,415, filed on Apr. 28, 2008.

(51) Int. Cl.
*G06F 19/00* (2011.01)

(52) U.S. Cl. .......................... 700/286; 700/28

(58) Field of Classification Search ............ 700/28, 700/286, 291, 294, 292, 297; 307/18, 19, 307/85, 86, 64, 125; 320/118; 363/125
See application file for complete search history.

(56) References Cited

U.S. PATENT DOCUMENTS

| | | | |
|---|---|---|---|
| 4,443,709 A | | 4/1984 | Genuit et al. |
| 5,101,191 A | | 3/1992 | MacFadyen et al. |
| 5,297,015 A | * | 3/1994 | Miyazaki et al. ............ 363/146 |
| 5,923,099 A | | 7/1999 | Bilir |
| 6,028,373 A | | 2/2000 | Kim et al. |
| 6,211,681 B1 | * | 4/2001 | Kagawa et al. ............... 324/426 |
| 6,356,471 B1 | * | 3/2002 | Fang ............................... 363/65 |
| 6,766,222 B1 | | 7/2004 | Duley |
| 6,801,027 B2 | * | 10/2004 | Hann et al. .................... 323/282 |
| 7,015,599 B2 | | 3/2006 | Gull et al. |
| 7,385,374 B2 | * | 6/2008 | Frantz et al. .................. 320/138 |
| 7,415,622 B2 | * | 8/2008 | Masson et al. ................ 713/300 |
| 2002/0010518 A1 | | 1/2002 | Reid et al. |
| 2002/0070610 A1 | * | 6/2002 | Bersiek .......................... 307/149 |
| 2003/0222509 A1 | | 12/2003 | Andarawis et al. |
| 2004/0257047 A1 | * | 12/2004 | Frantz et al. .................. 320/138 |
| 2004/0262997 A1 | * | 12/2004 | Gull et al. ....................... 307/64 |
| 2006/0017328 A1 | | 1/2006 | Bryde |
| 2007/0243425 A1 | | 10/2007 | Spaner |
| 2007/0253181 A1 | | 11/2007 | Bersiek |
| 2008/0030078 A1 | | 2/2008 | Whitted et al. |
| 2008/0067871 A1 | | 3/2008 | Black et al. |
| 2008/0084116 A1 | | 4/2008 | Terricciano et al. |

FOREIGN PATENT DOCUMENTS

WO WO 96/37025 11/1996

\* cited by examiner

*Primary Examiner* — Kidest Bahta
(74) *Attorney, Agent, or Firm* — Oliff & Berridge, PLC

(57) ABSTRACT

Aspects of the disclosure provides an adaptive power system to relieve manual efforts for performing appropriate power procedures. The adaptive power system can include a power source unit including a plurality of power sources and a power bus. The power source unit can be configured to provide electrical power from one or more of the power sources to the power bus. Further, the adaptive power system can include a power distribution unit configured to distribute electrical power from the power bus to a plurality of electrical devices. In addition, the adaptive power system can include a power control unit configured to control a power sequence for the power distribution unit to distribute electrical power from the power bus to the plurality of electrical devices in a coordinated manner consistent with load or time interval for each of the electrical devices.

18 Claims, 5 Drawing Sheets

ADAPTIVE POWER SYSTEM

INCORPORATION BY REFERENCE

This application claims the benefit of U.S. Provisional Application No. 61/071,415, "Adaptive Power System (APS) with One-Button Start" filed on Apr. 28, 2008, which is incorporated herein by reference in its entirety.

BACKGROUND

An electrical power system may provide power to various devices. Additionally, the electrical power system may include various power sources. For example, a vehicle, an aircraft, a maritime platform, and the like, may include an electrical power system to provide power to various electrical devices, such as computing device, communication device, entertaining device, monitoring device, and the like. Further, the electrical power system may use power from various sources, such as battery, fuel, and the like. In addition, the electrical power system may use external AC or DC power sources.

To appropriately power up the various electrical devices with the various power sources, an operator may need to take lengthy training classes to learn power procedures. In addition, even well trained operators may be not able to appropriately perform the power procedures, for example, in a battle.

SUMMARY

Aspects of the disclosure provide an adaptive power system to relieve manual efforts for performing appropriate power procedures.

The adaptive power system can include a power source unit including a plurality of power sources and a power bus. The power source unit can be configured to provide electrical power from one or more of the power sources to the power bus. Further, the adaptive power system can include a power distribution unit configured to distribute electrical power from the power bus to a plurality of electrical devices. In addition, the adaptive power system can include a power control unit configured to control a power sequence for the power distribution unit to distribute electrical power from the power bus to the plurality of electrical devices in a coordinated manner consistent with load or time interval for each of the electrical devices.

Aspects of the disclosure can also provide a method for distributing power. The method can include receiving a start signal, determining whether a plurality of power sources coupled to a power bus is available, and sequentially providing power from the power bus to a plurality of electrical devices in a coordinated manner consistent with load or time interval of the electrical devices, if a first power source is available.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

Figure 1:
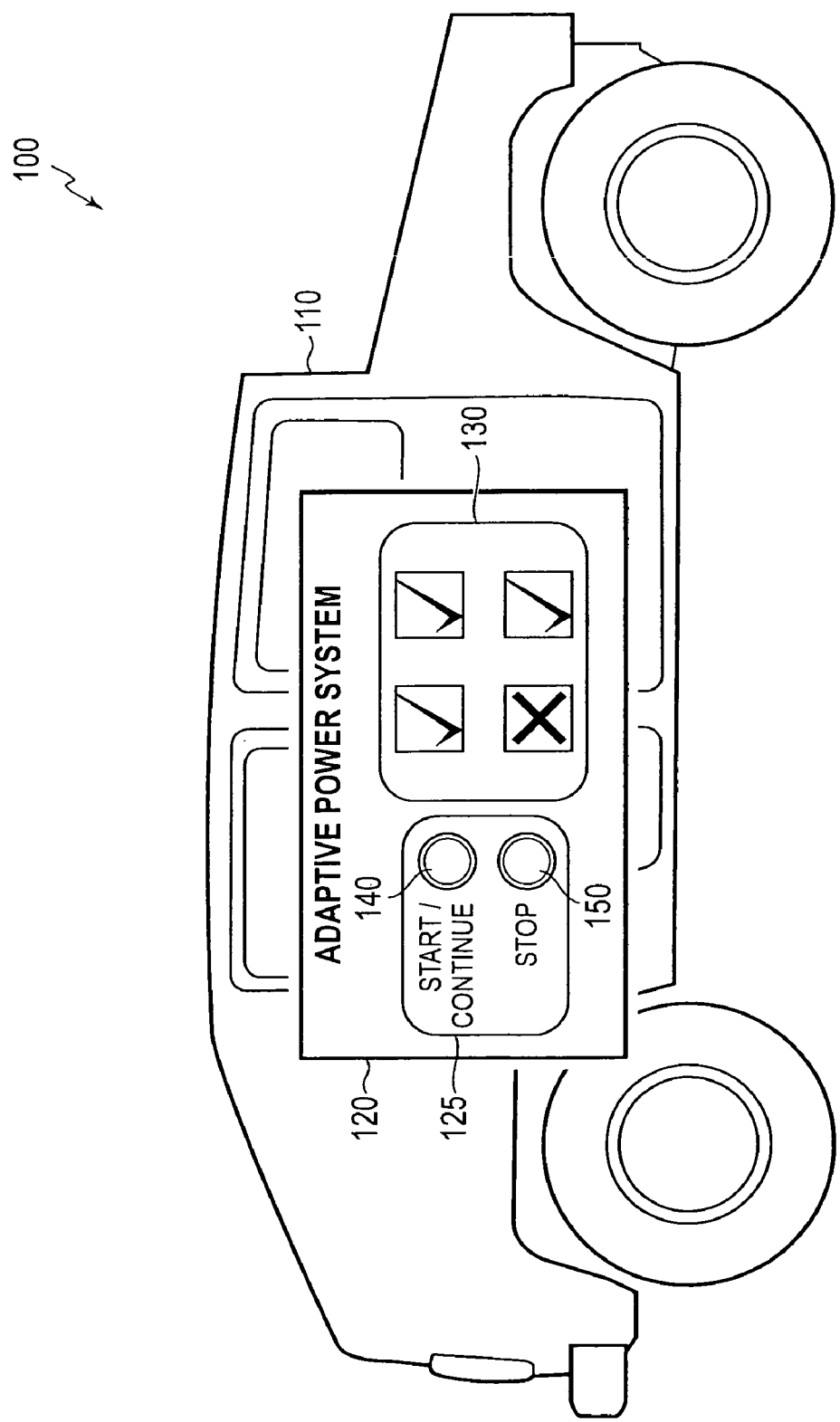
FIG. 1 shows an exemplary adaptive power system in a vehicle example.

FIG. 1 shows an exemplary adaptive power system 120 in a vehicle example. The adaptive power system 120 may include a control panel 125, and a display panel 130. The control panel 125 may receive control instructions from a user. According to the disclosure, the control panel 125 can be simple to use. The user may input instructions without looking at the control panel 125. For example, the control panel 125 may include a few buttons, such as a start/continue button 140, and a stop button 150, to let the user to control the adaptive power system 120. The display panel 130 may display a current power status of the adaptive power system 120.

The vehicle 110 may include various electrical devices. For example, the vehicle may be used in military applications, thus the vehicle may include electrical devices for mobile command, control, communications, computing, intelligence, surveillance, reconnaissance, and the like, such as satellite radio, global position system (GPS), night vision camera, and the like. The various electrical devices may have different power requirements. For example, some may require AC power, some may require DC power, some may require large current, some may require high voltage, and the like. In addition, the electrical devices may be of different importance. For example, some electrical devices may be mission critical, and some electrical devices may be additional to provide an improved performance.

According to the disclosure, the adaptive power system 120 can enable appropriate power procedure with a reduced user workload. For example, the start/continue button 140 may enable the user to start an appropriate power procedure for the electrical devices by a single button press. The single press can initiate the adaptive power system 120. The adaptive power system 120 may sense available power supplies, and can also sense system conditions, such as temperature, and the like. Further, the adaptive power system 120 may provide power to the various electrical devices in an appropriate sequence and at appropriate timings. In an embodiment, the adaptive power system 120 may power up the electrical devices according to loads of the electrical devices, such as large load first. Additionally, the adaptive power system 120 may allow a time interval, such as five seconds, between powering up two electrical devices. The time interval may allow each of the electrical device to stabilize its power load to the adaptive power system 120, due to the reason that an electrical device may have different power loads at a power-up time and a normal operation time.

According to the disclosure, the adaptive power system 120 may enable continuous power supply to the electrical devices while it transits the load from one power source to another power source. For example, the adaptive power system 120 may sense changes of power sources, such as an external AC power being un-plugged. The adaptive power system 120 can switch the electrical devices to another available power source without affecting operations of the electrical devices.

In addition, the adaptive power system 120 may shut down the electrical devices gracefully. For example, the adaptive power system 120 may sense no power sources available, or when the user presses the stop button 150. Then, the adaptive power system 120 may provide a backup power to the electrical devices, for example to store a last-known status in a non-volatile memory, before shutting down the electrical devices. Later on, the electrical devices may be recovered from the last known status. Further, the electrical devices may be shut down in an appropriate sequence, such as large non-critical load first, enabling extended operation of critical components.

According to an aspect of the disclosure, the power procedure of the adaptive power system 120 may be overridden by the user. For example, the adaptive power system 120 may include a critical operational mode button (not shown). The critical operational mode button may enable the user to avoid shutting down the mission critical electrical devices in a battle. The operator may press the critical operational mode button to override the power procedure of the adaptive power system 120, to allow the mission critical electrical devices to continue operation using a backup power.

It is noted that the adaptive power system 120 can be applied in any suitable applications to relieve manual efforts for performing appropriate power procedures.

Figure 2:
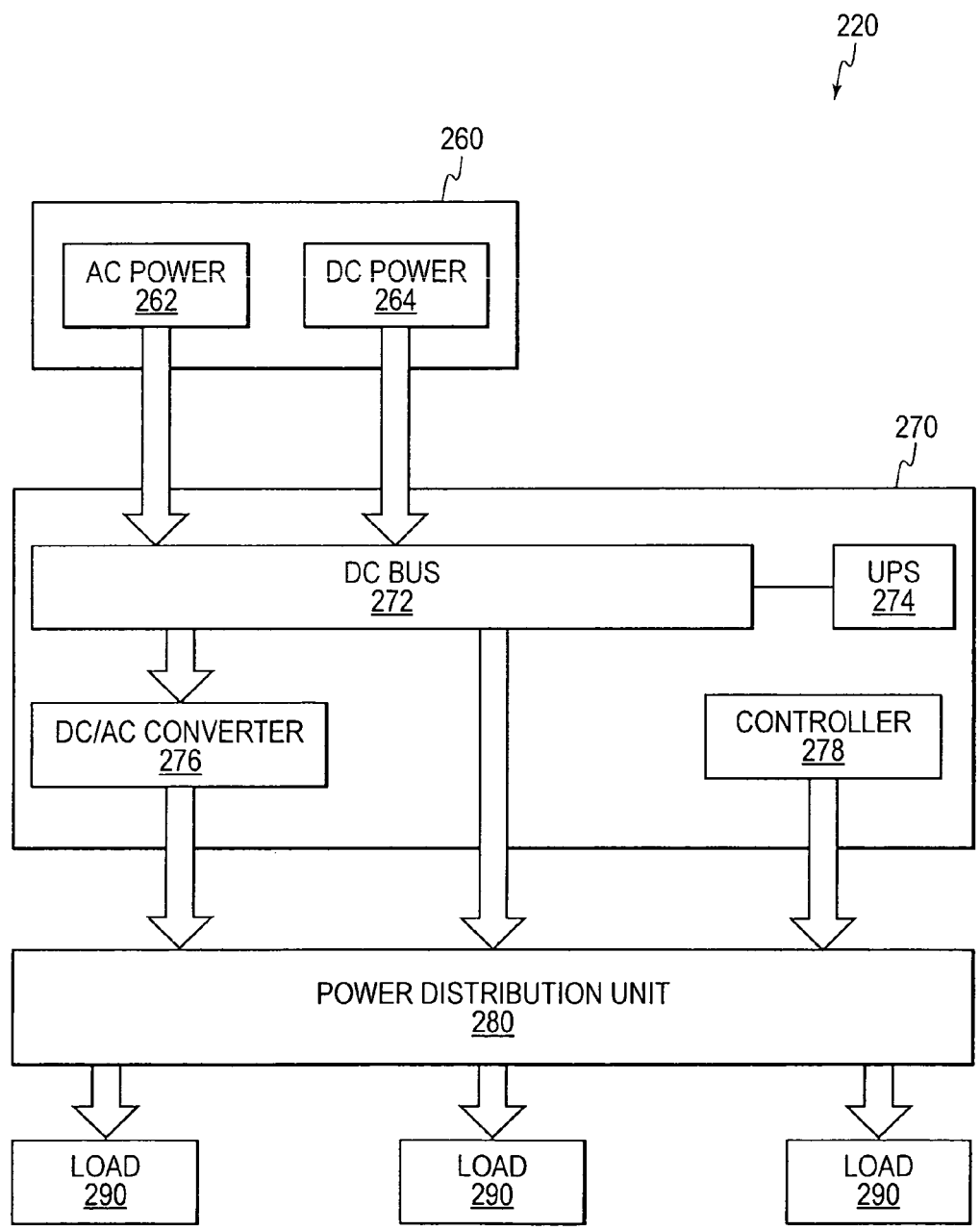
FIG. 2 shows a block diagram of an exemplary adaptive power system.

FIG. 2 shows a block diagram of an exemplary adaptive power system 220 according to the disclosure. The adaptive power system 220 may include a power source module 260, a power control unit 270, a power distribution unit 280, and a plurality of electrical devices 290 shown as loads to the adaptive power system 220. These elements can be coupled together as shown in FIG. 2.

The power source module 260 may include various power sources, such as fuel, battery, vehicle generator, and the like. Further, the power sources module 260 may include interfaces to external power sources, such as an adaptor to external AC power source, and interface to external DC power sources. Thus, the adaptive power system 220 may be able to operate anywhere in the world, such as on an aircraft, on a ship, on a vehicle, and the like. In addition, the power sources module 260 may include various conversion circuits, such as voltage regulator, AC/DC converter, and the like. The various conversion circuits may convert the power from the various power sources into a single form, such as 24V DC. The converted power can be provided to the power control unit 270.

The power control unit 270 can receive the power from the various power sources, and provide appropriate power and power controls, which can be transmitted to appropriate electrical devices 290 by the power distribution unit 280. According to the disclosure, the power control unit 270 can include a DC bus 272, an uninterruptible power supply (UPS) 274, a DC/AC converter 276, and a controller 278. These elements can be coupled together as shown in FIG. 2.

The DC bus 272 can couple power inputs from the various power sources of the power sources module 260 into a uniform power source. For example, the DC bus 272 may include switches on power paths from the power inputs. In addition, the DC bus 272 can include power sensors that can sense availabilities of the power inputs. Further, the DC bus 272 can control the switches based on the power sensors to transfer the loads of the electrical devices 290 to an available power source automatically.

The UPS 274 can maintain the continuous power on the DC bus 272 for a time period. The UPS 274 may include Li-Ion or other high capacity batteries, and a charger that can re-charge the Li-Ion batteries from an available power source. Further, the Li-Ion batteries can support the DC bus 272 to satisfy power needs of the electrical devices 290, for a time period when none of the power inputs are available. For example, when a power input, which is currently in use, is not available, it may take a time duration for the DC bus 272 to sense the non-availability of the power input, detect an available power input, and transfer the loads of the electrical devices 290 to the available power input. The UPS 274 can provide power for the electrical devices 290 during the time duration.

In another example, at a time, none of the power inputs from the power source module 260 is available, the adaptive power system 220 may perform a graceful shut down procedure. The graceful shut down procedure may include storing a last-known status, and powering off the electrical devices 290 in a sequence. The graceful shut down procedure may take a time duration, and the UPS 274 can provide the power needs for critical components for the time duration.

The DC/AC converter 276 can convert the DC power on the DC bus 272 to appropriate AC power to provide to a portion of the electrical devices 290 that may operate with AC power.

The controller 278 may receive various inputs, such as power sensor inputs, load sensor inputs, user inputs, temperature sensor inputs, and the like. Further, the controller 278 may determine an appropriate power procedure of the adaptive power system 220 based on the various inputs. Then, the controller 278 can provide control signals to various switching devices, and the electrical devices 290. For example, the controller 278 may transfer the loads from a first power source to a second power source by turning-off a switch on the power path from the first power source, and turning-on a switch on the power path from the second power source. In another example, the controller 278 may provide control signals to the electrical devices 290, for example, to instruct the electrical devices 290 to store a last known status.

Further, the controller 278 may control timings and sequence of the control signals to enable appropriate power procedures. In a power-on example, the controller 278 may send control signals to control the switches on the power paths to the various electrical devices 290 in a sequence, for example, large load first. Further, the controller 278 may control a time interval between the control signals to allow each electrical device to stabilize its load. In a power-off example, the controller 278 may store a last known status in a memory. The last known status may include current power status for the electrical devices 290, such as which one is powered on and/or which one is powered off. In an embodiment, the controller 278 may inform the electrical devices 290 to allow the electrical devices 290 to store their last know status, such as values stored in registers. Then, the controller 278 may control the switches on the power paths to the various electrical devices 290 in a priority sequence, for example, non-critical load first.

The power distribution unit 280 may include power paths to the various electrical devices 290. In addition, the power distribution unit 280 may include various filters, sensors, and switches. For example, the power distribution unit 280 may include an electromagnetic interference ("EMI") filter, such as telecommunications electronics material protected from emanating spurious transmissions (TEMPEST) filter, on a power path to an electrical device. The electromagnet filter can reduce electrical spurs, which may be generated when loads are transferred from one power source to another power source.

In another example, the power distribution unit 280 may include a switch, such as a circuit breaker, on a power path to an electrical device. The circuit breaker can sense a leaking current, and may break the power path automatically if that happens. In addition, the circuit breaker may be remotely controllable, for example, by the controller 278. Thus, the controller 278 may remotely control the power to the electrical device via the circuit breaker.

Figure 3:
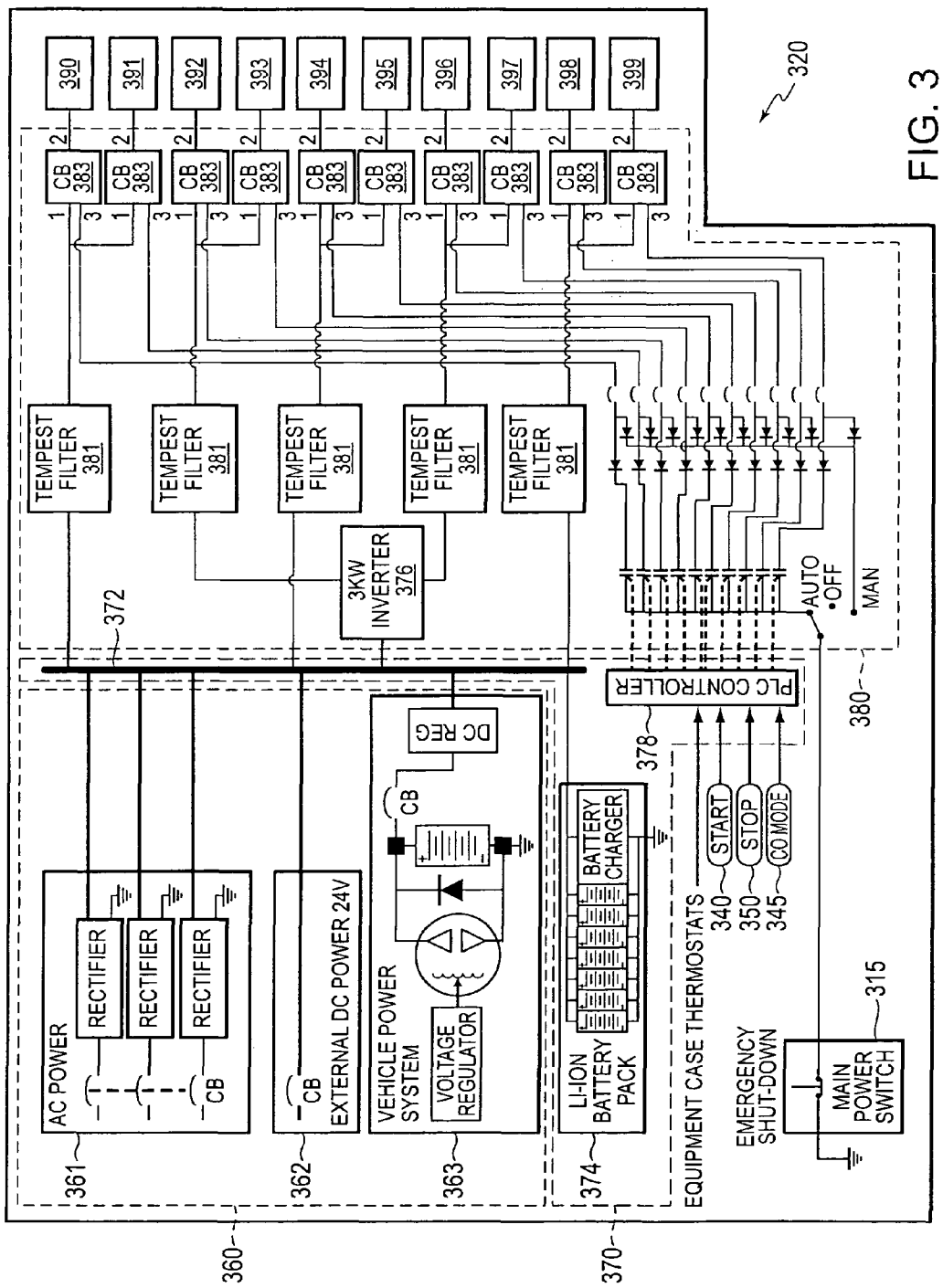
FIG. 3 shows a detailed block diagram of an exemplary adaptive power system.

FIG. 3 shows a detailed block diagram of an exemplary adaptive power system 320. The adaptive power system 320 can include a power source module 360, a power controller unit 370, a power distribution unit 380, a plurality of electrical devices 390-399, and a plurality of buttons, such as a start button 340, a stop button 350, a critical operational mode button 345, and an emergency shut down button 315. These elements can be coupled together as shown in FIG. 3.

The power source module 360 may include various power sources, such as an AC power source 361, an external DC power source 362, a vehicle power system 363, and the like. The AC power source 361 may provide 1-phase or 3-phase AC power. The AC power can be converted to DC power by rectifiers. The DC power can be provided to the power control unit 370.

The vehicle power system 363 may use electrical power from a vehicle, such as the vehicle that holds the adaptive power system 320. The electrical power from the vehicle can be regulated and stored in a battery. Further, the stored power may be converted to, for example, appropriate voltage level, and then provided to the power control unit 370.

In addition, the power source unit 360 may include switches, such as circuit breakers (CBs), on the power paths from the various power sources to the power control unit 370. The circuit breakers may prevent damage to the power sources.

The power control unit 372 may include a DC bus 372, a UPS 374, and a controller 378. These elements can be coupled together as shown in FIG. 3. The DC bus 372 may be coupled to the various power sources. Thus, the power of the DC bus 372 can be selectively supported by any of the various power sources. Further, the DC bus 372 can be supported by the UPS 374.

The UPS 374 may include a Li-Ion battery pack, and a battery charger coupled to the Li-Ion battery pack. The Li-Ion battery pack can be recharged when the DC bus 372 is supported by one of the various power sources. Further, when the DC bus 372 is supported by none of the various power sources, the Li-Ion battery pack can support the DC bus 372.

The controller 378 can receive various inputs, such as user inputs from various buttons, sensor inputs from various sensors. For example, the controller 378 may receive an input from the start button 340, an input from the stop button 350, an input from the critical operational mode button 345, and an input from a thermometer mounted on an equipment case. Further, the controller 378 can provide control signals to control various switches, circuit breakers. For example, the controller 378 can remotely control a circuit breaker on a path to an electrical device. More specifically, the controller 378 may provide a control signal, which may turn on or turn off a leakage path of the circuit breaker. When the leakage path is turned on, the circuit breaker can cut off power to the electrical devices.

Additionally, the controller 378 can provide the control signals based on the received various inputs. Further, the control signals may be provided at specific timings and sequences. For example, the control signals may follow a large load first sequence in a power up procedure, and may follow a small load first sequence in a shut-down procedure.

The controller 378 may be implemented by various technologies. In an embodiment, the controller 378 may be implemented by programmable logic control (PLC) that can program logic and timings of the control signals. In another embodiment, the controller 378 may be implemented as a processor executing software instructions. The software instructions may be stored in any suitable memory medium.

The power distribution unit 380 may include power transmission lines to provide power paths to the various electrical devices 390-399. Further, the power distribution unit 380 may include at least a DC/AC inverter 376, that can convert the DC power on the DC bus 370 to appropriate AC power, and provide to the electrical devices, such as 392, 394, 396 and 397, that may require AC power.

In addition, the power distribution unit 380 may include various filters, such as TEMPEST filters 381 on the power paths to the various electrical devices 390-399. The TEMPEST filters 381 can reduce electrical spurs in the provided power, thus the provided power can be substantially stabilized.

Further, the power distribution unit 380 may include circuit breakers 383 on the power paths to the various electrical devices 390-399. The circuit breakers 383 can sense leakage current, and can appropriately break the power paths when leakage current is large, in order to prevent damage to the adaptive power system 320. In addition, the circuit breakers 383 may be remotely controllable. For example, a circuit breaker 383 may be implemented by a residual current circuit breaker (RCCB), which can include a controllable earth wire. The controllable earth wire may be controlled by a control signal from the controller 378. The control signal may cause a leakage current in the controllable earth wire, which may further cause the RCCB to break the power path. Additionally, the circuit breakers 383 can be coupled to the emergency shut-down button 315. Thus, the circuit breakers 383 can break down the power paths when the emergency shut-down button 315 is pressed.

Figure 4:
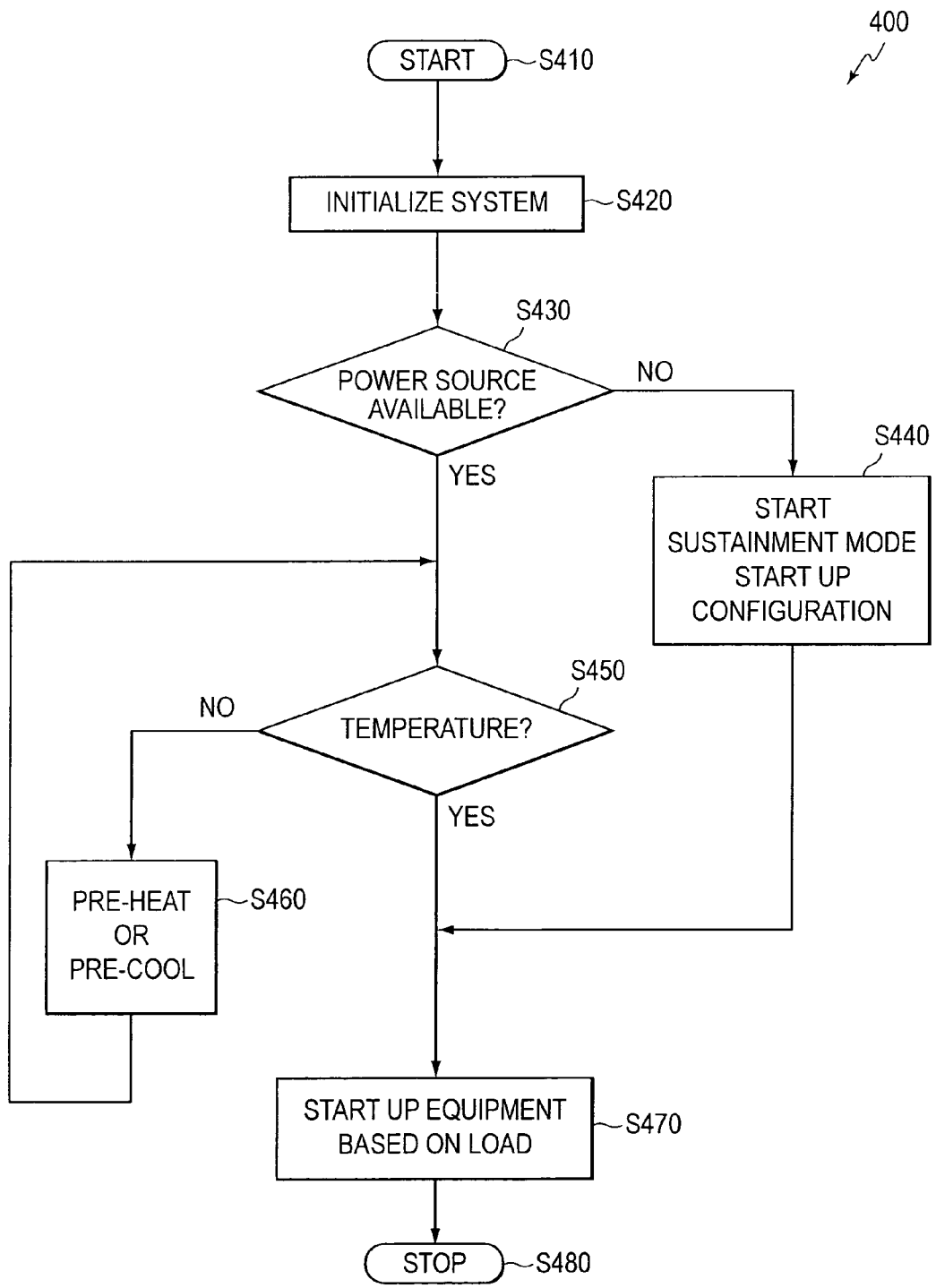
FIG. 4 shows a flowchart outlining an exemplary start-up process according to the disclosure.

FIG. 4 shows a flowchart outlining an exemplary start-up process. The start-up process can be performed by, for example, the adaptive power system 320, according to the disclosure. The start-up process may be activated by a button press of the start button 340. The process starts at step S410, and proceeds to step S420.

In step S420, the adaptive power system 320 may be initialized. For example, when the power controller module 370 is implemented as a general processor executing software instructions, the general processor may be powered up, for example, by a backup battery, and may load the software instructions into a closely coupled memory, such as SRAM. In another example, the general processor may wake up from a power saving mode, and load the software instructions into the SRAM. In another example, the power controller module 370 may load a previous stored status, such as a stored last-known status. The power controller module 370 may determine to recover the last-know status according to a timer, such as within 30 minutes of a power failure. Then, the process proceeds to step S430.

In step S430, the adaptive power system 320 may check availability of power sources, such as utility power, generator, solar power, fuel cell, mobile platform source, and the like. For example, the adaptive power system 320 may check power sensors coupled to the various power sources. If a power source is available, the process proceeds to step S450; otherwise, the process proceeds to step S440.

In step S440, the adaptive power system 320 may start a sustaining mode start-up configuration. In the sustaining mode start-up configuration, a portion of the electrical devices, such as a portion of mission critical electrical devices, are powered up. Then, the process proceeds to step S480, and terminates. Thus, the adaptive power system 320 works in a sustaining mode.

In step S450, the adaptive power system 320 may check temperature, such as environment temperature for the various electrical devices. For example, the controller 378 may check thermometer inputs from equipment cases. When the temperature is in an appropriate range, such as a workable range for the various electrical devices, the process proceeds to step S470; otherwise, the process proceeds to step S460.

In step S460, the adaptive power system 320 may instruct certain heating or cooling devices to pre-heat or pre-cool the environment for the various electrical devices. Then, the process returns to step S450 to check the temperature.

In step S470, the adaptive power system 320 may start a normal start-up procedure. In the normal start-up procedure, the controller 378 may send controls to activate the circuit breakers 383 remotely. The circuit breakers 383 may be activated in a sequence to power up the various electrical devices at appropriate timings. For example, the various electrical devices may be powered up according their loads. Then, the process proceeds to step S480 and terminates. Thus, the adaptive power system 320 can work in a normal operation mode.

Figure 5:
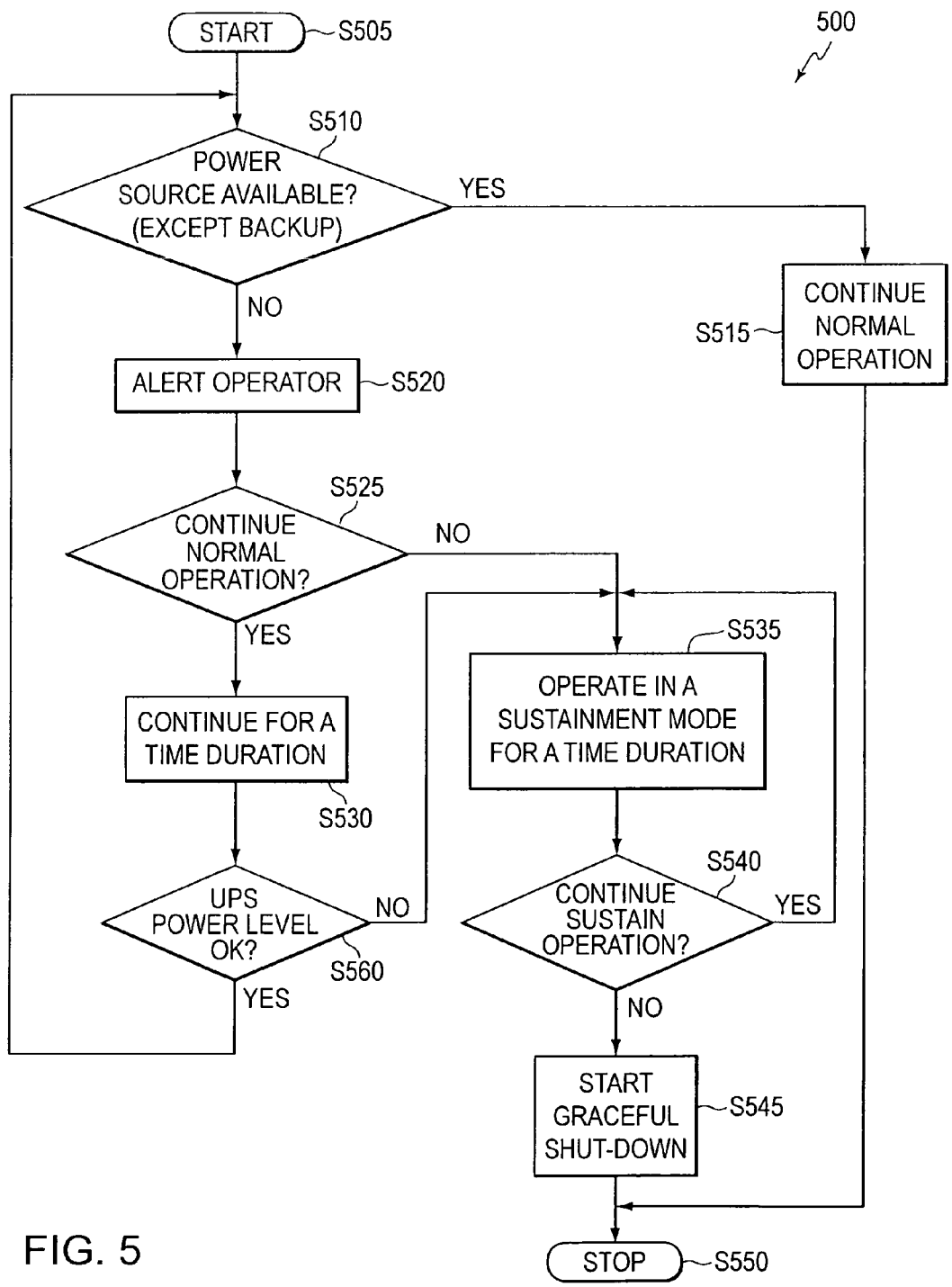
FIG. 5 shows a flowchart outlining an exemplary power system maintaining process.

FIG. 5 shows a flowchart outlining an exemplary power system maintaining process. The power system maintaining process may be activated when a first power source, which is in use, is unplugged. The process starts at step S505, and proceeds to step S510.

In step S510, the adaptive power system 320 may check availability of power sources. For example, the adaptive power system 320 may check power sensors coupled to various power sources. If a second power source is available, the process proceeds to step S515; otherwise, the process proceeds to step S520.

In step S515, the adaptive power system 320 can switch loads to the second power source while continues providing power to the various electrical devices. The adaptive power system 320 may use the electrical power provided from the UPS 374 to support the continuous operation during the switching. Thus, the various electrical devices can continue the normal operation. After the switching, the electrical power can be provided by the second power source. Then, the process proceeds to step S550, and terminates.

In step S520, the adaptive power system 320 may alert the user that the system is operating under a backup power. Then, the process proceeds to step S525.

In step S525, the adaptive power system 320 may determine whether the system should continue the normal operation. More specifically, if the user does not press any button, the adaptive power system 320 may change to the sustaining mode in default, then the process proceeds to step 535. If the adaptive power system 220 receives inputs from the user, the adaptive power system 320 may operate according to the inputs. For example, if the user may press the start button 340 or the critical operational mode button 345, the adaptive power system 320 can continue the normal operation, the process proceeds to step 530.

In step S530, the adaptive power system 320 may continue the normal operation using the electrical power from the UPS 374 for a time period. Then, the process proceeds to step S560.

In step S560, the adaptive power system 320 may determine whether the UPS 374 can support further normal operation. For example, the adaptive power system 320 may compare a remaining power level of the UPS 374 to a threshold. If the power level of the UPS 374 is lower than the threshold, the adaptive power system 320 may determine to operation in the sustaining mode, then the process proceeds to step S535; otherwise, the process returns to step S510 to check if a power source is available.

In step S535, the adaptive power system 320 may reconfigure the whole system into the sustaining mode, and operate for a time period. More specifically, the adaptive power system 320 may shut down a portion of the electrical devices, such as electrical devices that are not mission critical, and provide electrical power to mission critical devices. Then, the process proceeds to step S540.

In step S540, the adaptive power system 320 may determine whether to continue the sustaining mode. For example, the adaptive power system 320 may check the UPS 374 power level and user inputs. If the user instructs to continue the sustaining mode, and the power level of the UPS 374 allows, the process returns to step S535 to continue operation in the sustaining mode. Otherwise, the process proceeds to step S545.

In step S545, the adaptive power system 320 may start a graceful shut down procedure. During the graceful shut down, the controller 378 may send control signals to the various electrical devices 390-399. The various electrical devices 390-399 may store a last known status, such as registers values, in a non-volatile memory to prepare for the graceful shut-down. Further, the controller 378 may sequentially send control signals to remotely control the RCCBs to shut off the corresponding power paths. In an embodiment, the controller 378 may shut off the power paths according to power loads, such as small load first. Then, the process proceeds to step S550, and terminates.

It is noted that the adaptive power system may perform any other suitable power procedures. For example, the adaptive power system may perform a temperature power procedure that can manage the power mode of the various electrical devices based on temperature measurements by the temperature sensors. In another example, the adaptive power system may perform a fire suppression power procedure to manage the power mode of the various electrical devices based on first detection by a fire detector.

It is noted that the adaptive power system may be implemented as an integrated power system, which can be connected to various power sources, and provide powers to various AC and DC loads. In addition, the integrated power system can have reduced size and weight comparing to a combination of commercial-off-the-shelf products.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. An integrated adaptive power system, comprising:
    a power source unit including a plurality of power sources and a power bus, the power source unit being configured to provide electrical power from one or more of the power sources to the power bus;
    a power distribution unit configured to distribute electrical power from the power bus to a plurality of electrical devices; and
    a power control unit configured to control a power sequence for the power distribution unit to distribute electrical power from the power bus to the plurality of electrical devices in a coordinated manner consistent with load or time interval for each of the electrical devices, the power control unit having an uninterruptible power supply (UPS) configured to provide power to the power bus when none of the power sources is available, the power control unit further configured to determine to shut down non-critical parts of the electrical devices and to provide the electrical power to critical parts of the electrical devices when a power level of the UPS is lower than a threshold.

2. The integrated adaptive power system according to claim 1, wherein the power bus is a DC power bus, and the power source unit further comprises:
an AC/DC converter configured to convert AC power to DC power.

3. The integrated adaptive power system according to claim 1, wherein the power source unit further comprises:
an interface to receive at least one of external AC power and external DC power.

4. The integrated adaptive power system according to claim 1, wherein the power distribution unit further comprises:
a DC/AC converter configured to convert DC power to AC power to provide to at least a subset of the plurality of electrical devices.

5. The integrated adaptive power system according to claim 1, wherein the power distribution unit further comprises:
a filter configured to reduce electrical spurs in the distributed electrical power.

6. The integrated adaptive power system according to claim 1, wherein the power distribution unit further comprises:
a circuit breaker configured to cut off power distribution to an electrical device.

7. The integrated adaptive power system according to claim 1, wherein the power sequence is based on loads.

8. A method for distributing power, comprising:
receiving a start signal;
determining whether a plurality of power sources coupled to a power bus is available;
sequentially providing power from the power bus to a plurality of electrical devices in a coordinated manner consistent with load or time interval of the electrical devices, if a first power source is available;
determining a power level of uninterruptible power supply (UPS) configured to provide power to the power bus when none of the power sources is available; and
shutting down non-critical parts of the electrical devices and providing the power to critical parts of the electrical devices when the determined power level of the UPS is lower than a threshold.

9. The method according to claim 8, further comprising:
converting power from AC to DC if the first power source provides AC power.

10. The method according to claim 9, further comprising:
providing power using an uninterruptible power supply to a subset of the plurality of electrical devices if none of the power sources is available.

11. The method according to claim 8, further comprising:
delaying providing the power until a temperature is within a pre-defined range.

12. The method according to claim 8, further comprising:
providing power from an uninterruptible power supply if the first power source failed.

13. The method according to claim 12, further comprising:
determining whether a power source is available if the first power source is failed; and
switching the plurality of electrical devices to a second power source if the second power source is available.

14. The method according to claim 12, further comprising:
alerting if no power source is available; and
providing power using the uninterruptible power supply to a subset of the plurality of electrical devices.

15. The method according to claim 12, further comprising:
storing a last-known status of an electrical device before stopping the power to the electrical device.

16. The method according to claim 12, further comprising:
stopping the power to the plurality of electrical devices in a sequence based on loads of the plurality of electrical devices.

17. An integrated adaptive power system, comprising:
a power source unit including a plurality of power sources and a power bus, the power source unit being configured to provide electrical power from one or more of the power sources to the power bus;
a power distribution unit configured to distribute electrical power from the power bus to a plurality of electrical devices, the power distribution unit having a circuit breaker configured to cut off power distribution to one or more of the electrical devices and further configured to be activated remotely to power up the one or more of the electrical devices; and
a power control unit configured to control a power sequence for the power distribution unit to distribute electrical power from the power bus to the plurality of electrical devices in a coordinated manner consistent with load or time interval for each of the electrical devices.

18. An integrated adaptive power system, comprising:
a power source unit including a plurality of power sources and a power bus, the power source unit being configured to provide electrical power from one or more of the power sources to the power bus;
a power distribution unit configured to distribute electrical power from the power bus to a plurality of electrical devices; and
a power control unit configured to control a power sequence for the power distribution unit to distribute electrical power from the power bus to the plurality of electrical devices in a coordinated manner consistent with load or time interval for each of the electrical devices, the power control unit having an uninterruptible power supply (UPS) configured to provide power to the power bus when none of the power sources is available and configured to support continuous operation of the electrical devices during switching from a first power source to a second power source.

* * * * *